(12) United States Patent
Baek et al.

(10) Patent No.: US 7,774,439 B2
(45) Date of Patent: Aug. 10, 2010

(54) SENSING INFORMATION MANAGEMENT APPARATUS AND METHOD OF SENSOR BASED HOME NETWORK SYSTEM

(75) Inventors: Seung-Ho Baek, Daejeon (KR); Eun-Chang Choi, Daejeon (KR); Jae-Doo Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 166 days.

(21) Appl. No.: 12/084,490

(22) PCT Filed: Aug. 24, 2006

(86) PCT No.: PCT/KR2006/003347

§ 371 (c)(1),
(2), (4) Date: May 2, 2008

(87) PCT Pub. No.: WO2007/052886

PCT Pub. Date: May 10, 2007

(65) Prior Publication Data

US 2009/0157877 A1    Jun. 18, 2009

(30) Foreign Application Priority Data

Nov. 4, 2005    (KR) .................. 10-2005-0105300

(51) Int. Cl.
G06F 15/16    (2006.01)
G06F 12/00    (2006.01)

(52) U.S. Cl. ...................................... 709/220; 709/225

(58) Field of Classification Search ................. 709/220, 709/221, 217–219, 225, 250
See application file for complete search history.

(56) References Cited

U.S. PATENT DOCUMENTS

| 7,627,098 | B2 * | 12/2009 | Baik et al. ............ 379/102.05 |
| 2004/0002838 | A1 | 1/2004 | Oliver et al. |
| 2005/0283532 | A1 | 12/2005 | Kim et al. |
| 2007/0113249 | A1 * | 5/2007 | Kim et al. ..................... 725/45 |
| 2008/0283532 | A1 * | 11/2008 | Koch ..................... 220/495.03 |

FOREIGN PATENT DOCUMENTS

KR    10-0651729    11/2006
WO    WO 02/099597 A2    12/2002

OTHER PUBLICATIONS

International Search Report mailed Oct. 26, 2006 in connection with the International application PCT/KR2006/003347.

* cited by examiner

*Primary Examiner*—Zarni Maung
(74) *Attorney, Agent, or Firm*—Staas & Halsey LLP (57) ABSTRACT

An apparatus of managing sensing information for a sensor based home network and a method thereof are disclosed. The apparatus includes a sensor network to collect sensing information from multifunctional sensor nodes, a sensing information processing and managing unit for deciding the optimized context information through controlling and managing the collected sensing information according to all of the context information and providing services suitable to user's intention and environment. Therefore, the apparatus prevents collision and minimizes the interference generated between sensing information.

13 Claims, 6 Drawing Sheets

SENSING INFORMATION MANAGEMENT APPARATUS AND METHOD OF SENSOR BASED HOME NETWORK SYSTEM

CROSS REFERENCE TO RELATED APPLICATIONS

This application claims the benefit under 35 U.S.C. Section 371, of PCT International Application Number PCT/JP2006/003347, filed Aug. 24, 2006 and Korean Application No. 10-2005-0105300 filed Nov. 4, 2005 in Korea, the contents of all of which are incorporated herein by reference.

TECHNICAL FIELD

The present invention relates to a sensor based home network system, and more particularly, to an apparatus of managing sensing information in a sensor based home network to prevent collision of sensing information and to minimize interference thereof, and a method thereof.

BACKGROUND ART

In a ubiquitous environment, all objects, i.e., homes, offices, buildings, telemetric and intelligent robot, are connected together through a communication network and perform computing functions. A ubiquitous service denotes a service provided in the ubiquitous environment.

In the information technology (IT) generation, a human learns a computing skill to use them. That is, the computing technology is only a simple tool that improves productivity. However, a computing technology in the ubiquitous generation learns a human to intelligently and aquatically provide related services without requiring awareness of users to computing technologies.

Therefore, the ubiquitous service must be provided with a high intelligent level of object recognition technology that properly recognizes context and provides related services according to the recognized information. Although the ubiquitous environment is provided so a user may access the computer anytime anywhere because computers are embedded in all of objects in the ubiquitous environment, the ubiquitous service becomes a harmful technology giving inconvenience to the human if the high intelligent level of object recognition technology is not provided. That is, the high intelligent services must be provided in the ubiquitous environment. Such an environment is called as a ubiquitous intelligence.

There are three essential technologies required to embody the ubiquitous intelligence.

The first essential technology is a sensing information based context aware/decision technology. The sensing information based context aware/decision technology analyzes sensed information about objects around a user, determines whether the sensed information is related to the user's intention based on the analysis result and generates event signals in response to a service request.

The second technology is an autonomic computing technology. The automatic computing technology enables computers to automatically manage themselves in order to minimize participants of user.

The third technology is a self-growing engine that enables the ubiquitous environment to be automatically evolved by self-learning and growing.

Among the essential technologies, the context aware/decision technology was spotlighted as the most important technology for the ubiquitous intelligence environment.

The ubiquitous environment, i.e., an automated home network environment, begins with obtaining of diversity information. Such an obtaining of information is achieved through a sensor network the processes diversity information inputted from various sensors.

In order to recognize intentions of users and to provide various intelligent services based on the sensor network, it requires an information system that generates results optimized to the user's intention and the environment through obtaining accurate related information. However, the information of various sensors located at different environments are often lost and modified due to multifarious peripheral factors, such as redundancy, inconsistency, information transmission and time difference. Therefore, the optimized results may not be obtained not only from single sensing information, but also from multiple sensing information obtained from different sensors because the information would be modified or collided by various environmental variables.

Figure 1:
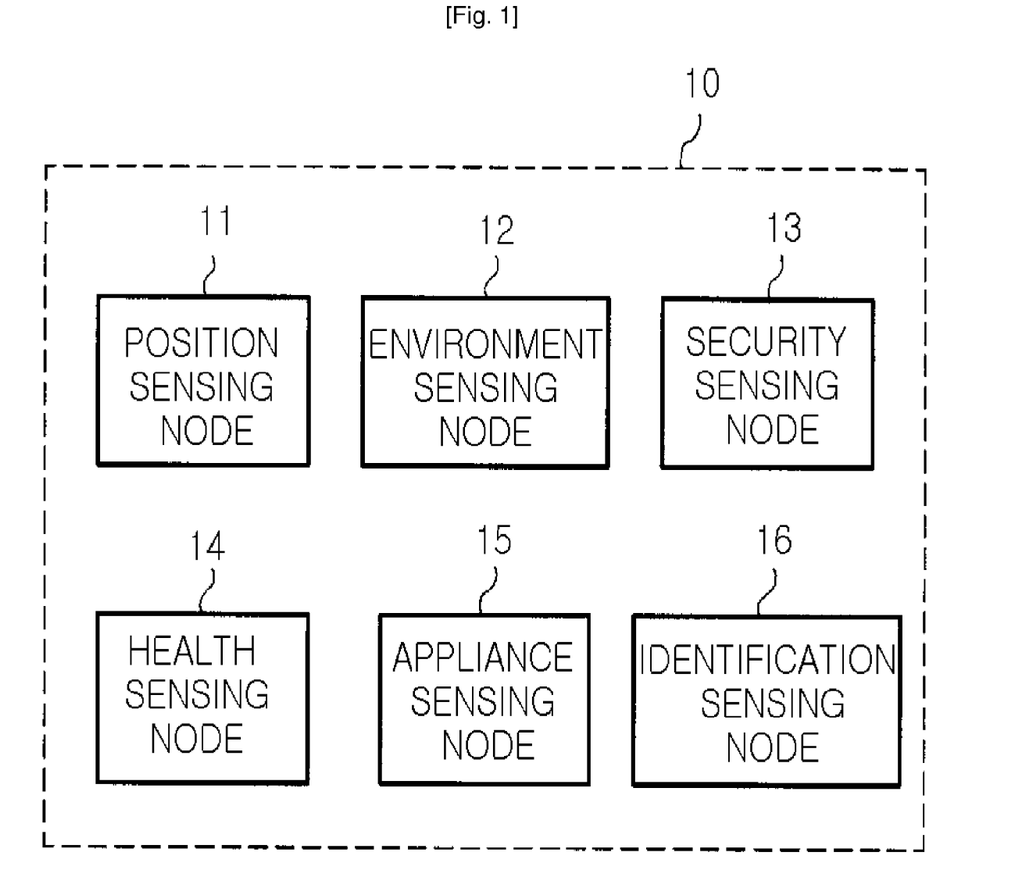
FIG. 1 is a block diagram of sensing nodes in a sensor based home network system according to the related art.

FIG. 1 is a block diagram of a sensing device of a sensor based home network system according to the related art.

Referring to FIG. 1, the sensor based home network system 10 includes a position sensing node 11 for sensing position information, an environment sensing node 12 for sensing environmental information, a security sensing node 13 for sensing information related to security, a health sensing node 14 for sensing information related parameters of health, an appliances sensing node 15 for sensing information about appliances in the home network system and an identification sensing node 16 for identifying a user. According to environment of home network system, the home network system may further include additional sensing nodes, and devices for management and supporting. Such a sensor based home network system 10 collects various information through a plurality of sensing nodes to perform diversity services.

As shown in FIG. 1, the conventional home network system has a sensing network structure configured of single functional node in one to one manner, which collects only information of sectored region. Since these sensing nodes 11 to 16 independently collect information and process according to own function, the resources are wasted and complexity of collecting information increases.

Therefore, the sensor based home network must be configured of sensing nodes having multiple functions such as sensing position, environmental information, security information an identifying information. In this case, the multi functional sensing nodes may generate different information for same object according to the location and the environment of information collecting node, or the sensed information are collided or interfered one another. For example, a temperature sensing node located at a shaded place and a temperature sensing node located at a sunny place may collect different information about temperature and light intensity for same time. Therefore, environmental context obtained through those temperature sensing nodes may not provide the optimized service to control lights and heating/cooling system of home.

If home context is configure by collecting information about security setting environment from multiple security sensing nodes and identification sensing nodes, the alarm system may be faulty operated according to the modification and deletion of information transmission by collecting inconstant habits of user and identified user information.

The conventional sensor based home network system 10 is not capable of properly controlling and managing collisions and interference frequently generated between information collected from sensing nodes because the sensing nodes of the home network system 10 independently collect and process information. The conventional sensor based home network system 10 generates an unintended service to a user by recognizing and deciding user's intention and environments based on incorrect information generated due to the collision and interference. Therefore, the usability the sensor based home network system 10 may be seriously influenced.

As described above, the sensing information processing technology of the conventional sensor based home network system 10 processes information based on a symmetrical interactive structure (independent) that obtains dedicated information values from independent sensing nodes having different attribute. Therefore, the conventional sensor based home network system 10 is unable to control and mange the collision and the interference generated between information in a hybrid home network environment having various sensing nodes with diversity attributes.

DISCLOSURE OF INVENTION

Technical Problem

Accordingly, the present invention is directed to a sensing information management apparatus and method of sensor based home network that substantially obviates one or more problems due to limitations and disadvantages of the related art.

An object of the present invention is to provide an apparatus of managing sensing information in a sensor based home network system for providing a service proper to user's intention and context by collecting information through multifunctional sensing nodes and deciding the context optimized through controlling and managing the collected information, and method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, an apparatus of managing sensing information for a sensor based home network, includes: a sensor network for obtaining various sensing information; a sensing information processing unit for receiving various sensing information from the sensor network, merging the received sensing information, transferring the merged sensing information to a sensing information managing unit, extracting optimized decision sensing information (DSI) from the sensing information managing unit, and transferring the extracted decision sensing information (DSI) to a context information recognition unit; a sensing information managing unit for receiving the merged sensing information from the sensing information processing unit, solving collision and interference generated between the sensing information, transferring an optimized decided sensing information (DSI) to the sensing information processing unit, receiving context managing information (CMI) from the context information recognition unit, checking a connectivity and a relationship between the context managing information (CMI) and the merged sensing information, and transferring related sensor managing information (SMI) to the context information recognition unit; and a context information recognition unit for providing the context managing information (CMI) to the sensing information managing unit, configuring decision context information (DCI) based on the decision sensing information (DSI) and the sensing managing information (SMI) received from the sensing information processing unit and the sensing information managing unit, and transferring the configured decision context information (DSI).

According to an aspect of the present invention, there is provided a method of managing sensing information of a sensor based home network, including: forming a logical attribute group by regularly extracting raw sensing information R1 to RJ from various sensor nodes in the home network according to a target object; merging the raw sensing information forming the logical attribute group and classifying the merged sensing information into a sensing information base; deciding a priority of sensor nodes according to a sensing information deciding algorithm with reference to the sensing information base, and deciding optimized sensing information; merging the decided sensing information, deciding context information based on the merged sensing information and configuring a service according to the decided context information; and checking available devices according to the decided context information and the service, and providing the service by controlling the service and the available devices.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings.

In the sensor based home network system, same type of sensing nodes may collect different information. In the present embodiment, collision of sensing information is defined as the difference between information collected by the same type sensing nodes. If home context is configured of information about security setting environment collected from different security sensing nodes and identification sensing nodes, attenuation is created between information by collecting and transmitting inconstant habits of user and identified user information. The interference between different sensing information is defined as the attenuation.

Figure 2:
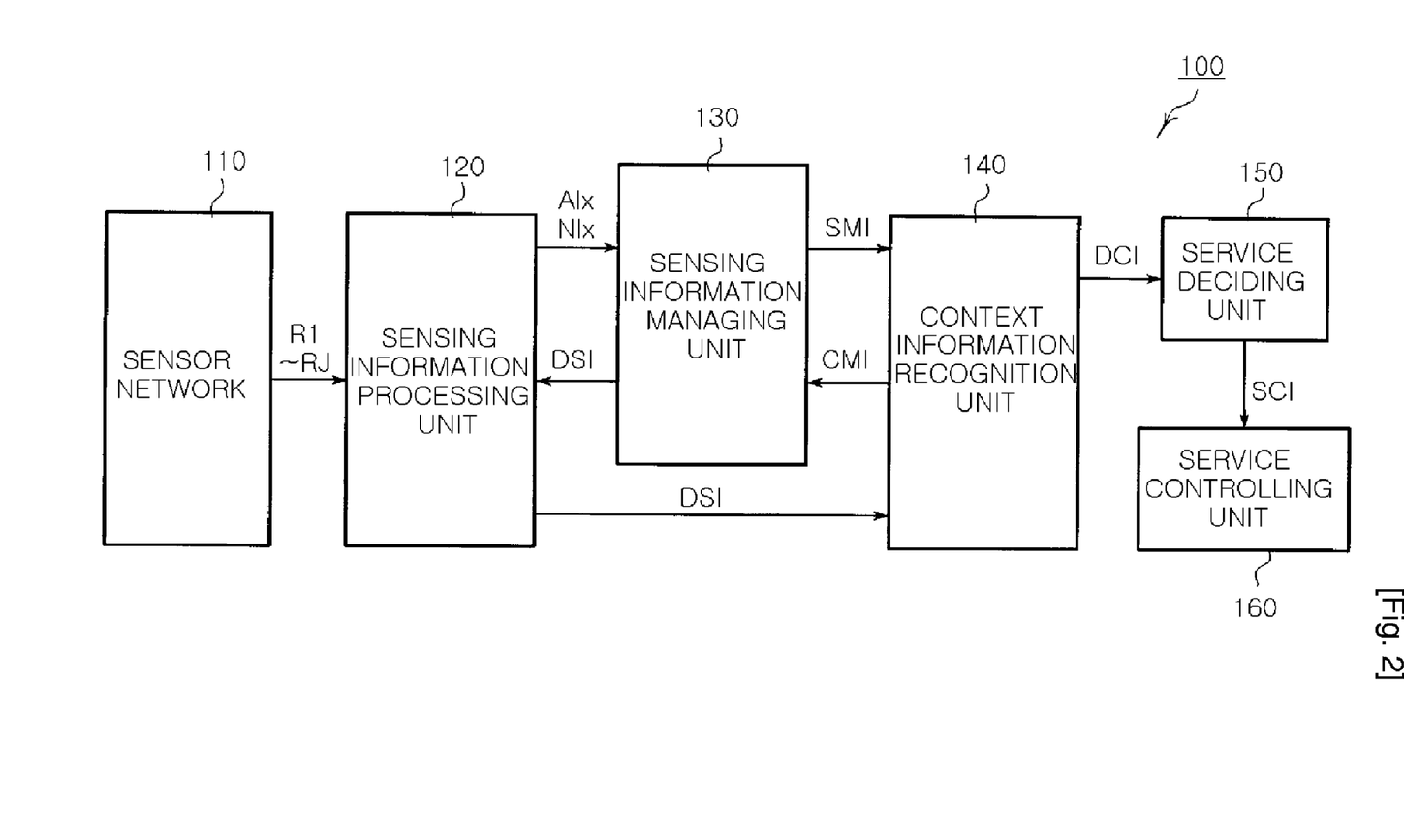
FIG. 2 is a block diagram illustrating an apparatus for managing sensing information according to an embodiment of the present invention.

FIG. 2 is a block diagram illustrating an apparatus of managing sensing information for a sensor based home network system according to an embodiment of the present invention.

Referring to FIG. 2, the apparatus 100 for managing sensing information according to the present embodiment includes: a sensor network 110, a sensing information processing unit 120, a sensing information managing unit 130, a context information recognition unit 140, a service deciding unit 150 and a service controlling unit 160.

The sensor network 110 has multiple functions to sense various information such as position, environment, security, health, appliance and identification. The sensing information processing unit 120 receives various sensing information from the sensor network 110, merges the received sensing information, transfers the merged sensing information, extracts optimized decided sensing information (DSI) from a sensing information managing unit 130, and transfers the extracted decided sensing information (DSI) to a context information recognition unit 140. The sensing information managing unit 130 receives the merged sensing information from the sensing information processing unit 120, solves collision and interference generated between the sensing information and transfers an optimized decided sensing information (DSI) to the sensing information processing unit 120. The sensing information managing unit 130 also receives context managing information (CMI) from the context information recognition unit 140 checks connectivity and relationship between the context managing information (CMI) and the sensing information, and transfers related sensor managing information (SMI) to the context information recognition unit 140. The context information recognition unit 140 provides the context managing information (CMI) to the sensing information managing unit 130, configures decision context information (DCI) based on the decision sensing information (DSI) and the sensing managing information (SMI) received from the sensing information processing unit 120 and the sensing information managing unit 130, and transfers the configured decision context information (DSI) to a service deciding unit 150. The service deciding unit 150 receives the decision context information (DCI) from the context information recognition unit 140 and decides optimized service context information among configured service information. The service controlling unit 160 receives the optimized service context information (SCI) from the service deciding unit 150 and provides corresponding service.

In more detail, the sensor network 110 is configured of sensor nodes having multiple functions to obtain various sensing information such as position, environment, security, health, appliance and identification. The sensor network 110 extracts various sensing information R1 to RJ and transfers the extracted sensing information to the sensing information processing unit 120.

The sensing information processing unit 120 is a core unit of the sensing information managing apparatus 100. The sensing information processing unit 120 merges the sensing information R1 to RJ collected through the sensor network 110 and transfers the merged sensing information to the sensing information managing unit 130 to classify the merged sensing information by sensor node information (NIx) and characteristic information (AIx) and to store.

The sensing information managing unit 130 solves the collision and interference generated between sensing information based on the sensor node information (NIx) and characteristic information (AIx) identified from the sensing information processing unit 120 and transfers the optimized decision sensing information (DSI) to the context information recognition unit 140 through the sensing information processing unit 120. Also, the sensing information managing unit 130 receives the context managing information (CMI) from the context information recognition unit 140, checks the connectivity and the relationship between the CMI and the stored sensing information, and transfers the corresponding sensor management information (SMI) to the context information recognition unit 140.

The context information recognition unit 140 recognizes peripheral context finally based on the sensor managing information (SMI) and the decision sensing information (DSI) transferred from the sensing information processing unit 120 and the sensing information managing unit 130. Then, the context information recognition unit 140 configures the decision context information (DCI) based on the recognized peripheral context.

The decision context information (DCI) configured through the context information recognition unit 140 is transferred to the service deciding unit 150. The service deciding unit 150 configures a service according to the corresponding context information, decides the optimized service context information (SCI) among them and transfers the decided SCI to the service controlling unit 160.

The service controlling unit 160 configures and drives the appliances and devices according to the SCI.

Figure 3:
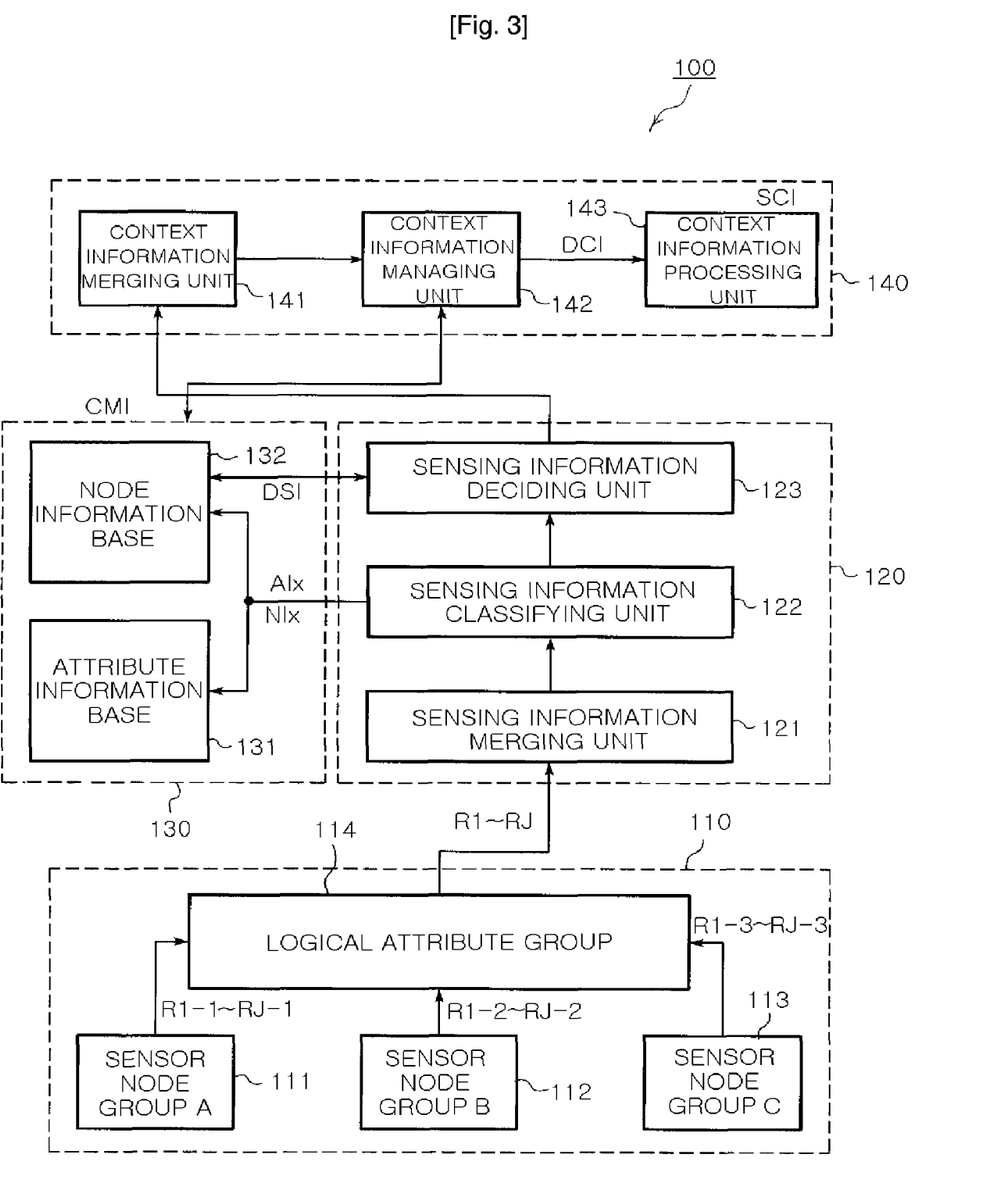
FIG. 3 is a detailed block diagram of the apparatus for managing sensing information shown in FIG. 2.

FIG. 3 is a detailed block diagram of the apparatus for managing sensing information shown in FIG. 2.

Referring to FIG. 3, the sensor networks 110 includes a sensor node group A 111, a second node group B 112 and a sensor node group C 113, which are configured according to a location of sensor. Also, the sensor network 110 has a structure to be expanded, occasionally. Each of the sensor node groups 111, 112 and 113 extracts raw sensing information R1 to RJ about context and environment at corresponding location and forms a logical attribute group 114 according to each of characteristic values thereof. For example, the logical attribute group 114 may be classified into a temperature group, a humidity group and an identification group. The sensor network 110 outputs the raw sensing information R1 to RJ to the sensing information processing unit 120.

The sensing information processing unit 120 includes a sensing information merging unit 121 for receiving the raw sensing information from the sensor network 110 and merging corresponding sensing information, a sensing information classifying unit 122 for receiving the merged sensing information from the sensing information merging unit 121, classifying the merged raw sensing information into the sensor node information (NIx) and the sensor attribute information (AIx), eliminates overlapped information or modified information, and transferring the results to the sensing information managing unit 130, and a sensing information deciding unit 123 for extracting an optimized deciding sensing information (DSI) from the sensing information managing unit 130 through the sensing node information (NIx) and the sensor attribute information (AIx) and outputting the extracted DSI to the context information recognition unit 140.

The sensing information merging unit 121 merges the raw sensing information transferred from the logical attribute group 114 the sensor network 110 and outputs the merged sensing information to the sensing information classifying unit 122. The sensing information classifying unit 122 classifies the merged raw sensing information into the sensor node information (NIx) and the sensor attribute information (AIx) and eliminates the overlapped information and the modified information. The classified sensing information, that is, the sensor node information (NIx) and the sensor attribute information (AIx), is transferred to the sensing information managing unit 130 and configured as a corresponding database. The sensing information deciding unit 123 extracts the optimized decision sensing information (DSI) from the sensing information managing unit 130 with reference to the regulated attribute information base 131 and the node information base 132, and outputs the extracted decision sensing information (DSI) to the context information recognition unit 140.

The sensing information managing unit 130 classifies sensing information from the sensing information classifying unit 122 into the node information base 132 and the attribute information base 131, arranges and manages the classified information. Such a regulated attribute information base 131 and node information base 132 are used to extract the optimized decision sensing information (DSI) from the sensing information deciding unit 123.

The context information recognition unit 140 includes a context information merging unit 141 for merging the optimized decision sensing information from the sensing information processing unit 120 and outputting the merged decision sensing information as context information, the context information managing unit 142 for analyzing the context information outputted from the context information merging unit 141, and outputting the optimized deciding context information (DCI) based on the sensor managing information (SMI) and the context managing information (CMI) of the sensing information managing unit 130, and a context information processing unit 143 for generating service context information that configures a service based on the deciding context information (DCI) outputted from the context information managing unit 142.

The context information merging unit 141 merges each of the optimized sensing decision information (DSI) transferred from the sensing information processing unit 120 and outputs the context information to the context information managing unit 142.

The context information managing unit 142 analyzes the context information outputted from the context information merging unit 141, generates the context managing information (CMI) and transfers the generated context managing information to the sensing information processing unit 130. The context information managing unit 142 also receives the sensor managing information (SMI), and outputs the decision context information optimized based on the sensor managing information (SMI) and the context managing information (CMI).

The decision context information (DCI) transferred from the context information managing unit 142 is outputted to the context information processing unit 143. The context information processing unit 143 generates service context information (SCI) for configuring a service based on the decision context information (DCI) outputted from the context information managing unit 142. Herein, the service context information (SCI) may be generated based on the various induction/learning algorithms.

Figure 4:
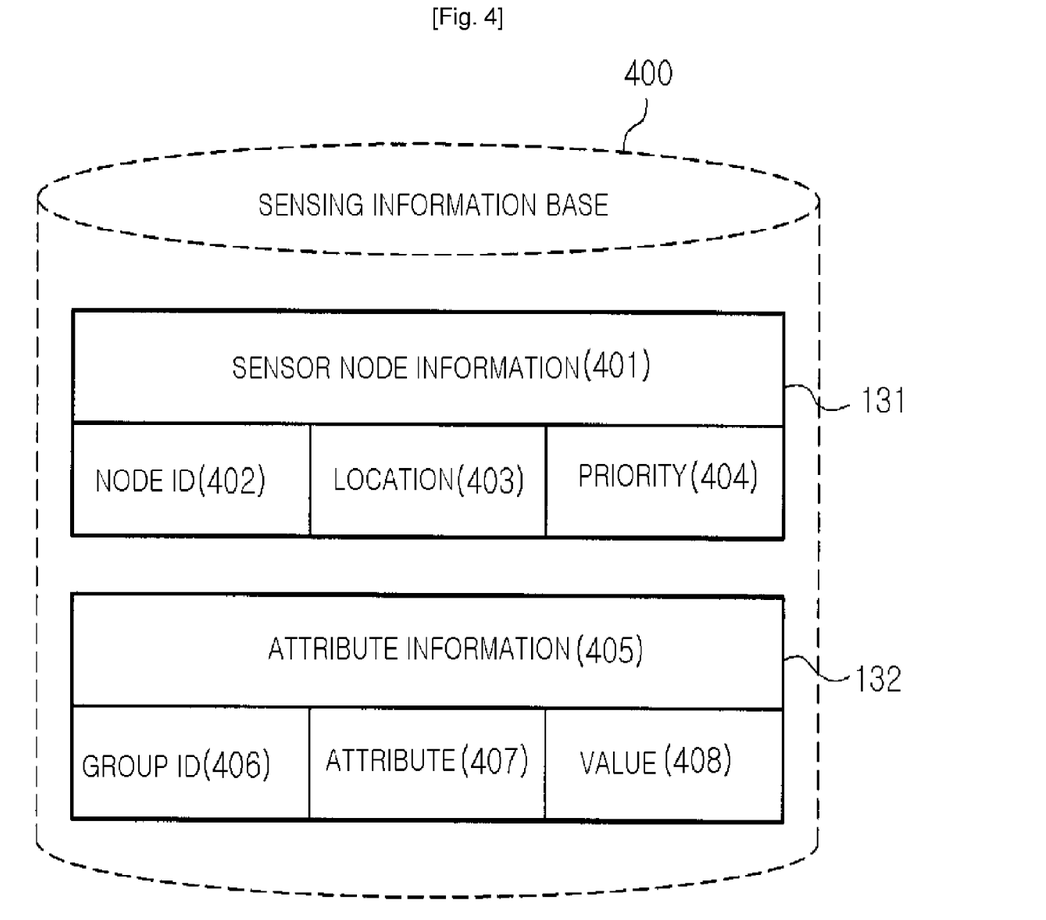
FIG. 4 shows a sensing information base (SIB) of the apparatus for managing sensing information shown in FIG. 2.

FIG. 4 shows a sensing information base (SIB) of the sensing information managing unit in the apparatus for managing sensing information shown in FIG. 2.

As shown in FIG. 4, the sensing information managing unit 130 includes a sensing information base 400. The sensing information base 400 includes the node information base 132 for storing the sensor node information (NIx) 401 and the attribute information base 131 for storing the sensor attribute information (AIx) 404.

The node information base 132 stores information about identifications 402 for nodes, location information 403 of sensor nodes and priority values (reliability) 404 of sensor nodes decided through the sensing information managing unit.

The attribute information base 131 expresses context and environment information extracted through each of the multifunctional sensor nodes. The attribute information base 131 includes information about group IDs 406 for attribute logical group, attribute expression information 407 for expressing the attributes and attribute values 408.

Tables 1 and 2 show examples of the node information base 132 and the attribute information base 131.

TABLE 1

Sensor node information (NIx)

| NODE ID | LOCATION | PRIORITY |
|---------|----------|----------|
| NID1 | ROOM 1 | 1 |
| NID2 | ROOM 1 | 3 |
| NID3 | LIVING ROOM | 2 |
| NIDx | ROOM X | X |

Table 1 is the sensor node information (NIx) base 132. As shown in Table 1, the sensor node informant (NIx) base 132 includes the node ID value 402 which is a unique ID value for all nodes assigned through an add/delete/edit function, the location information 403 of nodes which is identified by a unique number of room and an assigned number of kitchen which configure the general home network, and the priority value 404 that is decided through the sensing information deciding unit 123 according to the reliability, the mean value or the power intensity of node based on a priority deciding algorithm 300 of a sensor node.

TABLE 2 attribute information (AIx)

| GROUP ID | ATTRIBUTE | VALUE |
|----------|-----------|-------|
| GIDa | temperature | Degree (° C.) |
| GIDb | Illuminance | brightness |
| GIDc | Humidity | % |
| GIDx | X attribute | X |

Table 2 is the sensor attribute information (AIx) base 131. As shown in Table 2, the sensor attribute information (AIx) includes the group ID 406 for identifying groups classified by the attribute logical group 114 of the sensor network 110, and the attribute value 407 which is state or environment information name such as temperature, humidity, illuminance, human, object and appliance assigned according to corresponding group. Also, the extracted information value 408 of sensor node according to corresponding attribute value 407 is stored and managed by converting to corresponding unit value.

Figure 5:
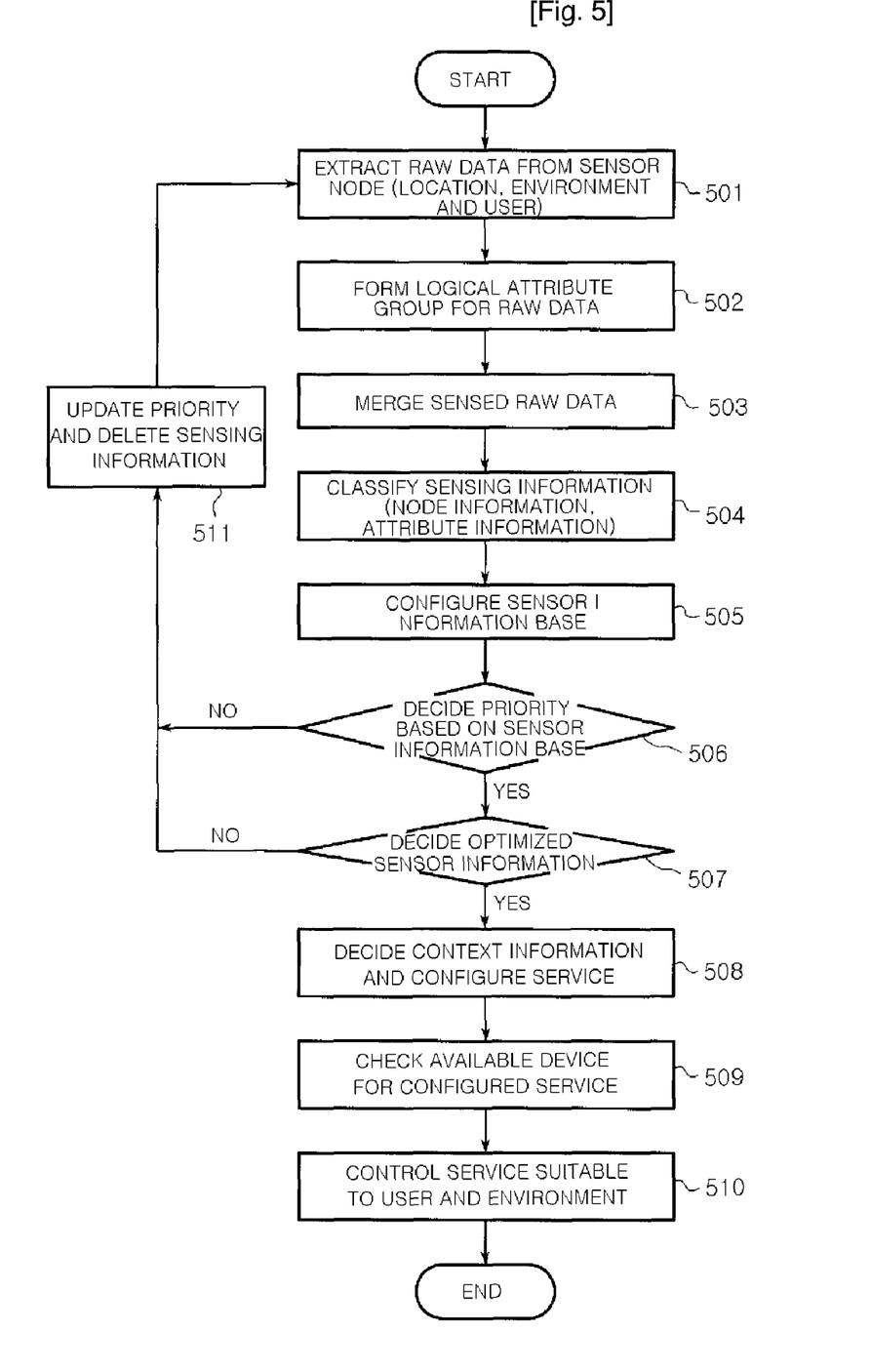
FIG. 5 is a flowchart illustrating a method of managing sensing information for a sensor based home network system according to an embodiment of the present invention.

FIG. 5 is a flowchart illustrating a method of managing sensing information for a sensor based home network system according to an embodiment of the present invention.

Referring to FIG. 5, the sensing information managing apparatus 100 according to the present embodiment regularly extracts the raw sensing information R1 to RJ about context or environment according to a target object from various sensor nodes in the home network in operation 501.

The extracted raw sensing information R1 to RJ forms the attribute logical group 114 of the sensor network 110 in operation S502 and are outputted to the sensing information processing unit 120.

The sensing information processing unit 120 merges sensing information generated from various network in operation S503 and classifies the merged sensing information into the information bases for configuring the sensing information base (SIB) in operation S504.

Then, the sensing information is classified into the node information (NIx) and the attribute information (AIx) according to the classified information base (SIB) and the sensing information base is configured accordingly in operation S505.

The sensing information deciding unit 123 decides the priority of sensor nodes according to a sensing information deciding algorithm with reference to the sensing information base in operation S506, and decides the optimized sensing information in operation S507. The sensing information deciding algorithm eliminates a minimum and a maximum value from the identical information arranged according to the time and defines the mean value of data with reference to a critical value for remained information.

If the priority of sensor node is not decided in operation S605 or if the optimized sensing information is not decided in operation S507, the priority is updated and the sensing information is eliminated. Then, the operation S501 is performed in operation S511. In order to update the priority, the maximum value of the minimum value is selected when the data is decided, the information of sensor node having a large difference from the critical value is deleted, the priority of corresponding node is reduced, the priority of the node having attribute value identical to the decided sensing information increases. Then, if the sensing information is not generated for all cases, the operation 501 is performed to extract the raw sensing information.

The context information recognition unit 140 decides the context information based on the decided sensing information and configures the service according to the corresponding decision context information in operation S508.

The service deciding unit 150 checks the available devices according to the configured service and the decision context information in operation S509, and transfers the service configuration and the available device information to the service controlling unit 160.

Figure 6:
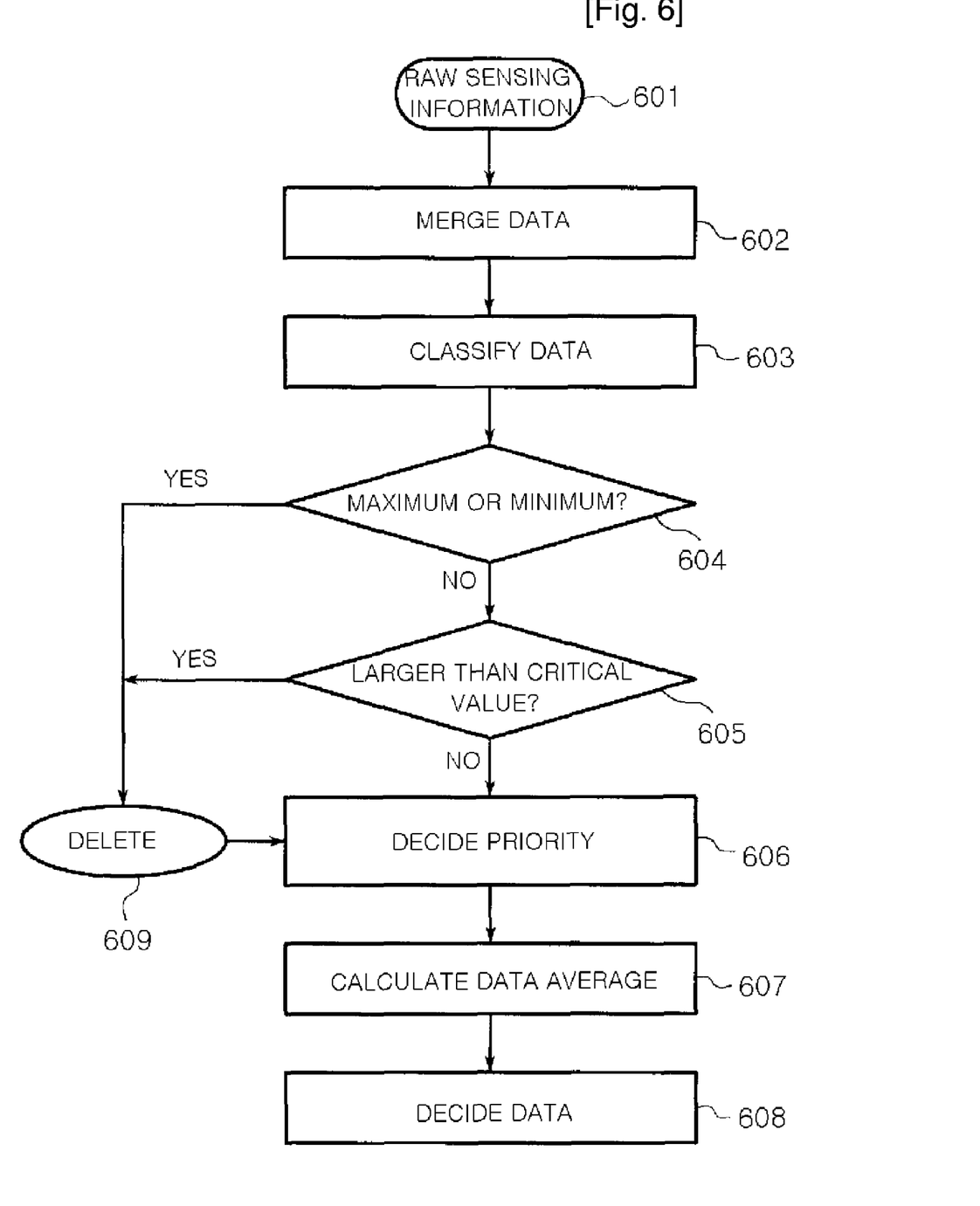
FIG. 6 is a flowchart showing operations for deciding a priority of sensing node and deciding context in the method of managing sensing information for a sensor based home network system according to an embodiment of the present invention.

FIG. 6 is a flowchart showing operations for deciding a priority of sensing node and deciding context in the method of managing sensing information for a sensor based home network system according to an embodiment of the present invention.

Referring to FIG. 6, the raw sensing information 601 extracted from the sensor network 110 are merged at the sensing information processing unit 120 in operation S602, and the merged information are classified into the sensor node information and the sensor attribute information in operation S603.

The classified sensing information is managed as the sensing information base in the sensing information managing unit 130 and the optimized sensing information is decided according to the sensing information base (SIB) in operation S608.

The optimized data is decided in the sensing processing unit 120. That is, the maximum value and the minimum value among the collected attribute values are determined based on the previously extracted information base in operation in operation S604. Then, the maximum value and the minimum value are deleted in operation S609.

Then, the remained attribute values excepting the maximum value and the minimum value are compared to the critical value in operation S605. Herein, the critical value is a value predetermined based on the optimized mean value based on the accumulated service configuring information, the information base for driving information and an average value optimized through the context information recognition unit 140. That is, if the remained attribute values are larger than the critical value, it determines whether the difference between the attribute value and the critical value is large or not in operation S605. If the difference is large, the corresponding value is deleted in operation S609.

If the corresponding attribute values are deleted through operations S604, S605 and S609, it determines that there is problem in reliability of corresponding node or for driving the corresponding node. In operation S606, the priority of sensor nodes are decided by reducing the priority of the sensor node related to the deleted attribute values and maintaining the priority of the sensor node related to not deleted attribute value.

An average value of the attribute values remained after the priority updating and modifying operation are calculated in operation S607, and the optimized sensing information is decided according to the average value in operation S608.

The decided final sensing information value is recognized as the context information to configure a service by the context information recognition unit 140.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, the sensing information managing apparatus for the sensor based home network according to the present invention prevents collision and minimizes the interference generated between sensing information by collecting sensing information through multifunctional sensor nodes, deciding the optimized context information through controlling and managing the collected sensing information according to all of the context information and providing services suitable to user's intention and environment.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. An apparatus of managing sensing information for a sensor based home network, comprising:
   a sensor network for obtaining various sensing information;
   a sensing information processing unit for receiving various sensing information from the sensor network, merging the received sensing information, transferring the merged sensing information to a sensing information managing unit, extracting optimized decision sensing information (DSI) from the sensing information managing unit, and transferring the extracted decision sensing information (DSI) to a context information recognition unit;

a sensing information managing unit for receiving the merged sensing information from the sensing information processing unit, solving collision and interference generated between the sensing information, transferring an optimized decided sensing information (DSI) to the sensing information processing unit, receiving context managing information (CMI) from the context information recognition unit, checking a connectivity and a relationship between the context managing information (CMI) and the merged sensing information, and transferring related sensor managing information (SMI) to the context information recognition unit; and a context information recognition unit for providing the context managing information (CMI) to the sensing information managing unit, configuring decision context information (DCI) based on the decision sensing information (DSI) and the sensing managing information (SMI) received from the sensing information processing unit and the sensing information managing unit, and transferring the configured decision context information (DSI).

2. The apparatus of claim 1, further comprising:

a service deciding unit for receiving the decision context information (DCI) from the context information recognition unit and deciding optimized service context information among configured service information; and a service controlling unit for receiving the optimized service context information (SCI) from the service deciding unit and providing corresponding service.

3. The apparatus of claim 1, wherein the sensor network includes: a plurality of sensor node groups according to a location of a sensor and a logical attribute group for extracting the sensing information RI to RJ about context and environment generated from corresponding location of the plurality of sensor node groups, classifying the extracted sensing information RI to RJ according to attribute values and transferring the classified sensing information to the sensing information processing unit.

4. The apparatus of claim 1, wherein the sensing information processing unit includes:

a sensing information merging unit for receiving the raw sensing information from the sensor network and merging corresponding sensing information;

a sensing information classifying unit for receiving the merged sensing information from the sensing information merging unit, classifying the merged raw sensing information into sensor node information (NIx) and sensor attribute information (AIx), eliminates overlapped information or modified information, and transferring the sensor node information (NIx) and the sensor attribute information (AIx) to the sensing information managing unit; and a sensing information deciding unit for extracting an optimized deciding sensing information (DSI) from the sensing information managing unit through the sensing node information (NIx) and the sensor attribute information (AIx) and outputting the extracted DSI to the context information recognition unit.

5. The apparatus of claim 4, wherein the sensing information managing unit classifies the sensor node information (NIx) and the sensor attribute information (AIx) into a node information base and an attribute information base, arranges the node information base and the attribute information base and manages the node information base and the attribute information base.

6. The apparatus of claim 1, wherein the context information recognition unit includes a context information merging unit for merging the optimized decision sensing information from the sensing information processing unit and outputting the merged decision sensing information as context information;

a context information managing unit for analyzing the context information outputted from the context information merging unit, generating context managing information (CMI), and outputting the optimized deciding context information (DCI) based on the sensor managing information (SMI) and the context managing information (CMI) of the sensing information managing unit; and a context information processing unit for generating service context information to configure a service based on the deciding context information (DCI) outputted from the context information managing unit.

7. The apparatus of claim 2, wherein the sensor network includes:

a plurality of sensor node groups according to a location of a sensor; and a logical attribute group for extracting the sensing information RI to RJ about context and environment generated from corresponding location of the plurality of sensor node groups, classifying the extracted sensing information RI to RJ according to attribute values and transferring the classified sensing information to the sensing information processing unit.

8. The apparatus of claim 2, wherein the sensing information processing unit includes:

a sensing information merging unit for receiving the raw sensing information from the sensor network and merging corresponding sensing information;

a sensing information classifying unit for receiving the merged sensing information from the sensing information merging unit, classifying the merged raw sensing information into sensor node information (NIx) and sensor attribute information (AIx), eliminates overlapped information or modified information, and transferring the sensor node information (NIx) and the sensor attribute information (AIx) to the sensing information managing unit; and a sensing information deciding unit for extracting an optimized deciding sensing information (DSI) from the sensing information managing unit through the sensing node information (NIx) and the sensor attribute information (AIx) and outputting the extracted DSI to the context information recognition unit.

9. The apparatus of claim 2, wherein the context information recognition unit includes a context information merging unit for merging the optimized decision sensing information from the sensing information processing unit and outputting the merged decision sensing information as context information;

a context information managing unit for analyzing the context information outputted from the context information merging unit, generating context managing information (CMI), and outputting the optimized deciding context information (DCI) based on the sensor managing information (SMI) and the context managing information (CMI) of the sensing information managing unit; and a context information processing unit for generating service context information to configure a service based on the deciding context information (DCI) outputted from the context information managing unit.

10. A method of managing sensing information of a sensor based home network, comprising:
 forming a logical attribute group by regularly extracting raw sensing information RI to RJ from various sensor nodes in the home network according to a target object;
 merging the raw sensing information forming the logical attribute group and classifying the merged sensing information into a sensing information base;
 deciding a priority of sensor nodes according to a sensing information deciding algorithm with reference to the sensing information base, and deciding optimized sensing information;
 merging the decided sensing information, deciding context information based on the merged sensing information and configuring a service according to the decided context information; and
 checking available devices according to the decided context information and the service, and providing the service by controlling the service and the available devices.

11. The method of claim 10, wherein the deciding of the priority includes:
 comparing a maximum value and a minimum value among collected attribute values are selected with reference to the configured sensing information base, and deleting one of the collected attribute value if the collected attribute value is the maximum value or the minimum value;
 comparing the attribute values not one of the maximum value and the minimum value to a critical value for an average value, and deleting the attribute value if the attribute value has a different larger than the corresponding critical value;
 comparing the attribute values not one of the maximum value and the minimum value to a critical value for an average value, and maintaining an original priority if the attribute value has a different not larger than the corresponding critical value; and
 calculating a new average value for attribute values remained after the priority updating and the attribute information modifying, and deciding the optimized sensing information based on the new average value.

12. The method of claim 11, wherein the optimized sensing information value in the deciding of the optimized sensing information based on the new average value is recognizable as the context information for configuring a service.

13. The method of claim 11, wherein the critical value is predetermined based on an average value optimized through accumulated service configuring information, information base for driving information and a context information recognition unit.

* * * * *